(12) United States Patent
Owen et al.

(10) Patent No.: US 7,621,513 B2
(45) Date of Patent: Nov. 24, 2009

(54) STABILIZER BAR LATERAL RETAINER COLLAR

(75) Inventors: Derek Owen, Beighton (GB); Garrick Holmes, Rotherham (GB)

(73) Assignee: ArvinMeritor Light Vehicle Systems (UK) Lt.d, West Midlands (GB)

( * ) Notice: Subject to any disclaimer, the term of this patent is extended or adjusted under 35 U.S.C. 154(b) by 88 days.

(21) Appl. No.: 10/680,986

(22) Filed: Oct. 8, 2003

(65) Prior Publication Data

US 2005/0077663 A1    Apr. 14, 2005

(51) Int. Cl.
    *B60G 21/055* (2006.01)
(52) U.S. Cl. .................. 267/273; 267/188; 267/276
(58) Field of Classification Search ............... 267/284, 267/188, 189, 276–282, 273; 403/385, 399, 403/384; 411/361; 401/341; 280/124.166
See application file for complete search history.

(56) References Cited

U.S. PATENT DOCUMENTS

| | | | | | |
|---|---|---|---|---|---|
| 2,824,751 | A | * | 2/1958 | Wilfert ................ 280/124.166 |
| 2,915,321 | A | * | 12/1959 | Wilfert ........................ 267/276 |
| 4,082,243 | A | * | 4/1978 | Watt et al. ................. 248/205.1 |
| 4,143,887 | A | * | 3/1979 | Williams et al. ............ 267/276 |
| 4,192,529 | A | * | 3/1980 | Shiratori et al. ............ 267/276 |
| 4,818,166 | A | * | 4/1989 | Szukay et al. ............... 411/361 |
| 5,013,166 | A | * | 5/1991 | Domer ........................ 267/276 |
| 5,108,055 | A | * | 4/1992 | Kreinberg et al. ............. 248/71 |
| 5,352,044 | A | * | 10/1994 | Jordens et al. .............. 384/140 |
| 5,702,121 | A |   | 12/1997 | Song |
| 5,836,598 | A |   | 11/1998 | Parker et al. |
| 5,876,148 | A |   | 3/1999 | Kraps |
| 6,206,392 | B1 | * | 3/2001 | Siecinski et al. ...... 280/124.166 |
| 6,254,114 | B1 |   | 7/2001 | Pulling et al. |
| 6,604,270 | B2 |   | 8/2003 | Kincaid et al. |
| 6,685,381 | B1 | * | 2/2004 | Sugita et al. ................ 403/341 |
| 2003/0111817 | A1 |   | 6/2003 | Fader et al. |

FOREIGN PATENT DOCUMENTS

| | | |
|---|---|---|
| DE | 10321716 A1 * | 12/2004 |
| EP | 0 405 109 | 1/1991 |
| EP | 0 500 329 | 8/1999 |
| JP | 10193944 | 7/1998 |
| JP | 2000 079819 | 3/2000 |
| JP | 2001 165127 | 2/2001 |
| JP | 2001301437 | 10/2001 |
| WO | WO 97/37142 | 10/1997 |
| WO | WO 9954157 A1 * | 10/1999 |
| WO | WO 2006000281 A1 * | 1/2006 |

OTHER PUBLICATIONS

European Search Report, Feb. 4, 2005.

* cited by examiner

*Primary Examiner*—Christopher P Schwartz
(74) *Attorney, Agent, or Firm*—Carlson, Gaskey & Olds PC

(57) ABSTRACT

An anti-shift collar prevents lateral movement of a stabilizer bar assembly. The anti-shift collar is mounted to a fully formed stabilizer bar and then crimped to a central segment of the stabilizer bar at the desired position and is locked to the central segment thereby.

19 Claims, 2 Drawing Sheets

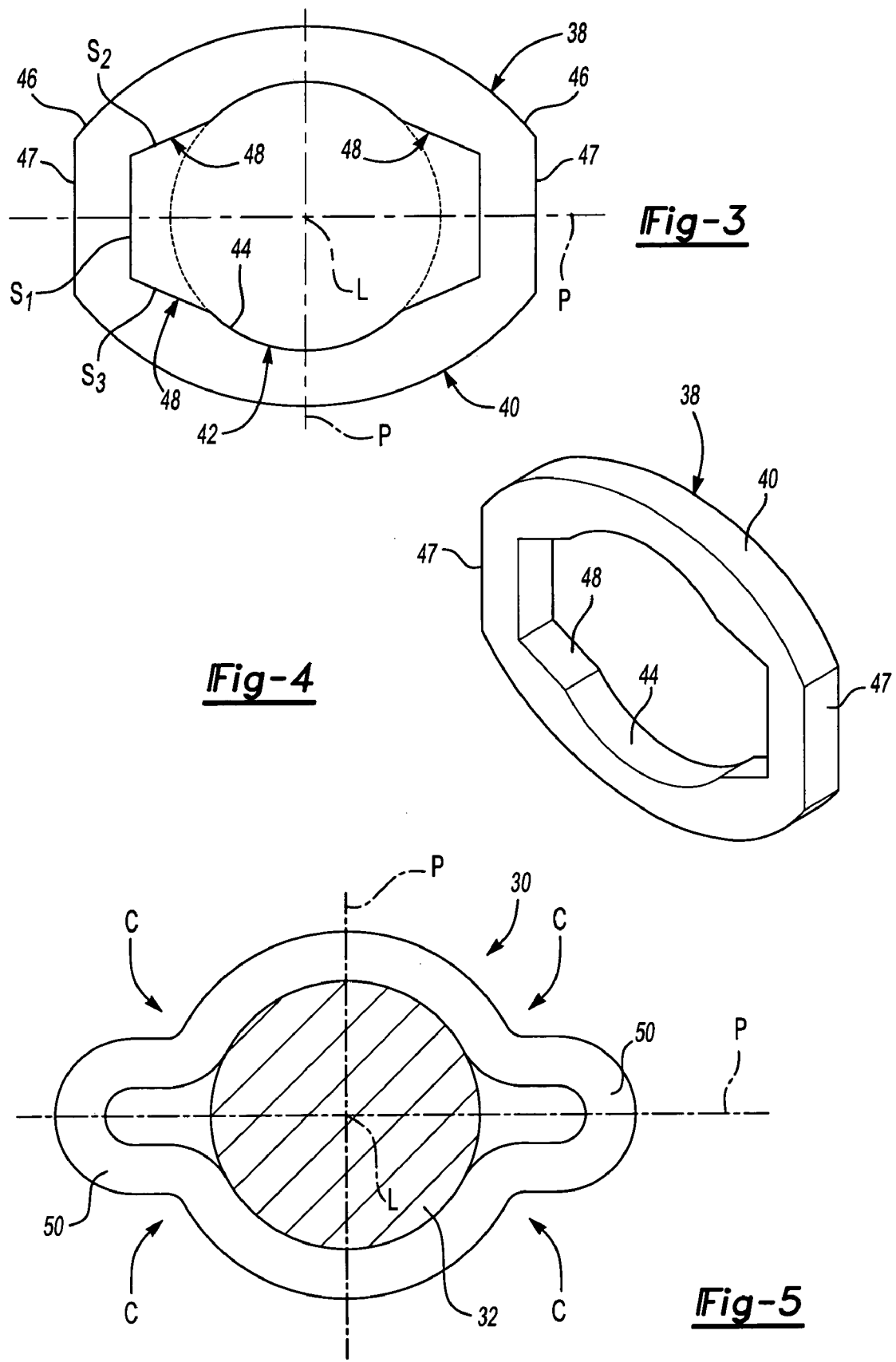

STABILIZER BAR LATERAL RETAINER COLLAR

BACKGROUND OF THE INVENTION

The present invention relates to a vehicle stabilizer bar, and more particularly to a lateral retainer collar therefor.

Vehicles are commonly equipped with independent suspension systems for absorbing road shock and other vibrations while providing a smooth and comfortable ride for the vehicle occupants. In suspension systems of this type, a stabilizer bar is often used to increase the roll rigidity and improve the steering stability of the vehicle.

Typically, the stabilizer bar is a rod-shaped member with a central segment oriented to extend laterally across the vehicle and having an arm segment extending longitudinally at each end of the central segment. The central segment of the stabilizer bar is supported for rotation about its own longitudinal axis by one or more mounting brackets which are fixed to the vehicle body or frame. The distal end of each arm segment is coupled to a control arm of the suspension system by an end link.

When the vehicle is subjected to a lateral rolling force such as, for example, while the vehicle negotiates a turn, the arm segments pivot in opposite directions with respect to the longitudinal axis of the central segment. As a result, torsional reaction forces are generated which act through the arm segments to urge the control arms to move toward their normal position. Thus, the vehicle body will be prevented from excessive rolling or leaning to either side by the torsional resistance produced by the stabilizer bar.

The stabilizer bar may shift laterally during suspension articulation. The lateral shift is resisted by a multiple of collars mounted to the central segment of the stabilizer bar. The collars facially engage bushings mounting to the vehicle body or frame to minimize lateral shift of the stabilizer bar.

The collars are mounted to the stabilizer bar after final shot peening and bending operations are performed to avoid reducing the stabilizer bar integrity. Due to the collar mounting locations and forming requirements, conventional collars are overmolded plastic components. Although effective, overmolded collars may be subject to relatively rapid wear while metallic collars have heretofore been complicated to mount.

Accordingly, it is desirable to provide an inexpensive collar, which is uncomplicated to mount, yet resists side forces from the stabilizer bar for a prolonged service life without appreciable wear.

SUMMARY OF THE INVENTION

The anti-shift collar according to the present invention prevents lateral movement of a stabilizer bar assembly. The anti-shift collar has an internal profile that allows it to be mounted onto the bar over a previously formed end. This end is typically a forged spade end and the internal profile of the collar reflects this form. The anti-shift collar is crimped to the central segment of the stabilizer bar and is locked to the central segment thereby.

The present invention therefore provide an inexpensive collar which is uncomplicated to mount yet resists side forces from the stabilizer bar for a prolonged service life without appreciable wear.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 3 is a plan view of an anti-shift collar prior to crimping;

FIG. 4 is a perspective view of an anti-shift collar prior to crimping; and

FIG. 5 is a plan view of an anti-shift collar after crimping.

DETAILED DESCRIPTION OF THE PREFERRED EMBODIMENT

Figure 1:
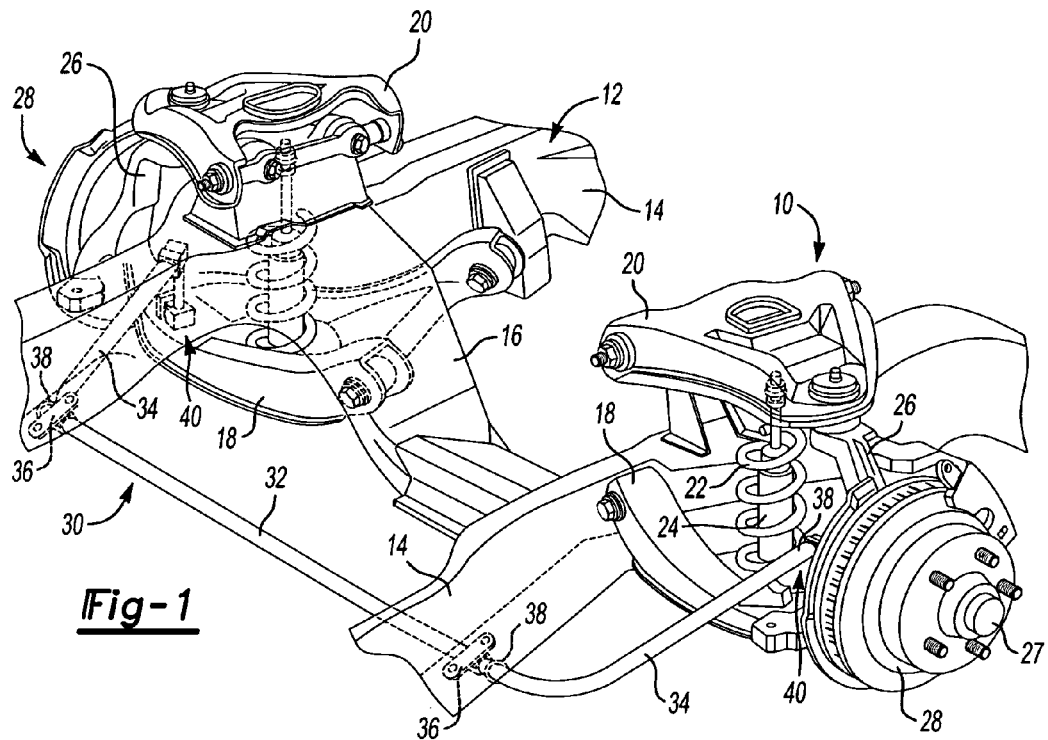
FIG. 1 is a general partial phantom view of a vehicle illustrating a suspension system.

FIG. 1 illustrates a general perspective view of an independent front wheel suspension system 10. It should be understood that although a particular suspension is disclosed in the illustrated embodiment, any suspension which utilizes a stabilizer bar will also benefit from the present invention.

A vehicle frame 12 includes a pair of longitudinal frame rails 14 and a crossbeam 16. Suspension system 10 includes a long lower control arm 18 and a short upper control arm 20 which are both pivotally attached to frame 12. A strut assembly having a helical coil spring 22 and a strut damper 24 is retained between an intermediate portion of lower control arm 18 and frame 12 to support the weight of the vehicle body and any loads which are transmitted through lower control arm 18. Upper control arm 20 is connected to lower control arm 18 by a steering knuckle 26. A hub and rotor assembly 28 is rotatably attached to a spindle portion 27 of steering knuckle 26 such that a wheel and tire (not shown) may be mounted thereon.

Figure 2:
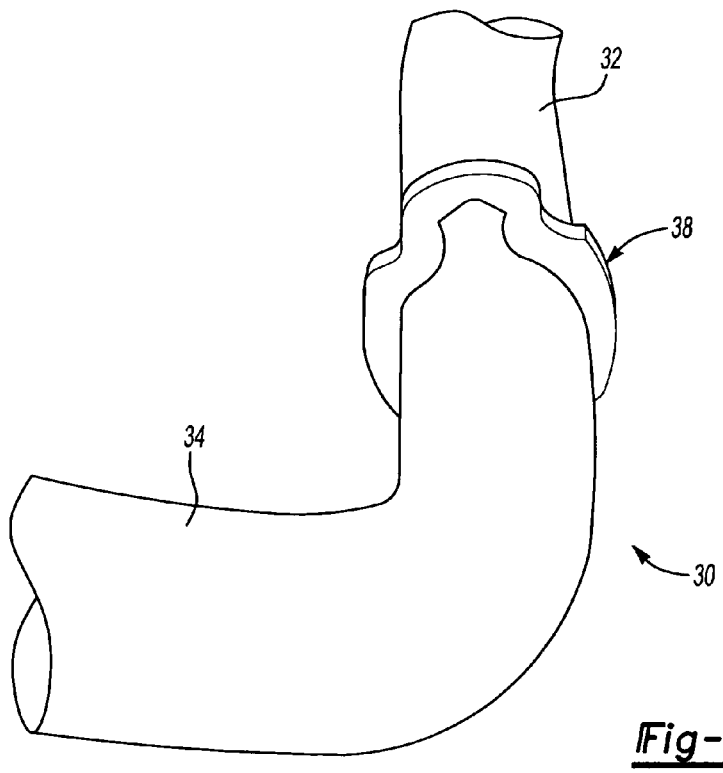
FIG. 2 is a perspective view of a stabilizer bar having an anti-shift collar according to the present invention.

A stabilizer bar assembly 30 includes an elongated central segment 32 which extends laterally across the vehicle and a pair of arm segments 34 which extend longitudinally along the vehicle at each end of central segment 32. Central segment 32 is rotatably attached to frame rails 14 through a pair of mounting brackets 36. An anti-shift collar 38 is crimped to the central segment 32 (also illustrated in FIG. 2) adjacent the mounting brackets 36 to minimize lateral shift of the stabilizer bar 30. Preferably, the anti-shift collar 38 is manufactured of a metallic material such as SAE BS970EN3.

Referring to FIG. 3, the anti-shift collar 38 is illustrated prior to crimping. It should be understood that the anti-shift collar 38 may be crimped at any desired location. The anti-shift collar 38 includes a generally elliptical outer perimeter 40. The smaller radius ends 46 adjacent the clipped ends 46 of the elliptical outer perimeter 40 are preferably clipped. That is, the clipped ends 46 are linear and break the elliptical outer perimeter 40.

An inner perimeter 42 includes a semi-circular portion 44 and a polygonal portion 48 adjacent each of the clipped ends 46 of the elliptical outer perimeter 40 (also illustrated in FIG. 4). The semi-circular portion 44 is preferably large enough to be received over a finished and shot peened arm segment 34, the elongated central segment 32 and the bends therebetween (FIG. 1). In addition, any formed ends such as forged eyes may also be passed therethrough. That is, the polygonal portions 48 allow the anti-shift collar 38 to be slid to a desired position over the formed ends then crimped into place.

The polygonal portion 48 adjacent each of the clipped ends 46 includes a first surface S1, a second surface S2, and a third surface S3. The first surface S1 are generally parallel to the respective clipped ends 47. The second surface S2 and the third surface S3 extend from the first surface S1 in a non-perpendicular manner to thereby define the polygonal portion 48. The second surface S2 and the third surface S3 intersect the respective semi-circular portions 44.

Referring to FIG. 5, the anti-shift collar 38 is illustrated after a crimping operation is performed such that the anti-shift collar 38 is locked to the central segment 32 thereby. A crimp (illustrated schematically by arrow C) is preferably made upon the elliptical outer perimeter 40 adjacent each polygonal portion 48. That is, the clipped ends 47 are crimped to form pinched areas 50 which extend outward from the central segment 32 along a longitudinal axis P, while the semi-circular portions 44 are defined along a lateral axis p. The pinched areas 50 are thereby formed generally transverse to the stabilizer bar assembly 30 to lock the anti-shift collar 38 thereto. Notably, the crimps C which form pinched areas 50 are directed generally transverse to the bar and are not directed inward toward a central longitudinal axis L of the central segment 32 of the stabilizer bar assembly 30. The configuration of the elliptical outer perimeter 40 and the clipped ends 47 advantageously simplifies crimping to two opposed locations. In addition to allowing passage over formed stabilizer ends, the pinched areas 50 take-up the clearance between the semi-circular portion 44 prior to crimping and the central segment 32. A rigid and relatively uncomplicated mounted is thereby provided.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An anti-shift collar comprising:
an elliptical outer perimeter;
a first clipped end and a second clipped end formed in said elliptical outer perimeter; and
an inner perimeter including a semi-circular inner perimeter portion having a first semi-circular surface, a second, opposed semi-circular surface, a first polygonal inner perimeter portion and a second polygonal inner perimeter portion, each of the first semi-circular surface and the second, opposed semi-circular surface being connected on one end to said first polygonal inner perimeter portion and on an opposite end to said second polygonal inner perimeter portion such that together said first semi-circular surface, said second, opposed semi-circular surface, said first polygonal inner perimeter portion, and said second polygonal inner perimeter portion entirely form said inner perimeter, and said first polygonal inner perimeter portion and said second polygonal inner perimeter portion formed respectively adjacent said respective first clipped end and second clipped end.

2. The anti-shift collar as recited in claim 1, wherein said first polygonal portion and said second polygonal portion each include a first surface with a component respectively parallel to said first clipped end and a second clipped end.

3. The anti-shift collar as recited in claim 2, wherein said first polygonal portion and said second polygonal portion each include a second surface and a third surface non-perpendicular with said first surface.

4. The anti-shift collar as recited in claim 2, wherein said semi-circular portion is defined about a central longitudinal axis, said first surface tangential to said semi-circular portion.

5. The anti-shift collar as recited in claim 1, wherein said second surface and said third surface are non-parallel to a longitudinal axis of the anti-shift collar, said longitudinal axis defined through a center of a circle formed by said semi-circular inner perimeter portion.

6. The anti-shift collar as recited in claim 5, wherein said anti-shift collar is a generally planar member transverse to said longitudinal axis.

7. The anti-shift collar as recited in claim 6, wherein said anti-shift collar is generally a flat plate.

8. The anti-shift collar as recited in claim 1, wherein the first and second clipped ends are straight.

9. The anti-shift collar as recited in claim 1, wherein the first and second clipped ends are adjacent, respectively, to the first polygonal inner perimeter portion and the second polygonal inner perimeter portion.

10. The anti-shift collar as recited in claim 1, wherein the first polygonal inner perimeter portion and the second polygonal inner perimeter portion each include three straight sides.

11. An anti-shift collar comprising:
an elliptical outer perimeter;
a first clipped end and a second clipped end formed in said elliptical outer perimeter; and
an inner perimeter including a semi-circular inner perimeter portion having a first semi-circular surface, a second, opposed semi-circular surface, a first polygonal inner perimeter portion and a second polygonal inner perimeter portion, each of the first semi-circular surface and the second, opposed semi-circular surface being connected on one end to said first polygonal inner perimeter portion and on an opposite end to said second polygonal inner perimeter portion such that together said first semi-circular surface, said second, opposed semi-circular surface, said first polygonal inner perimeter portion, and said second polygonal inner perimeter portion entirely form said inner perimeter, and said first polygonal inner perimeter portion and said second polygonal inner perimeter portion each include a first surface, a second surface and a third surface, said second surface and said third surface non-perpendicular with said first surface.

12. The anti-shift collar as recited in claim 11, wherein said second surface and said third surface are non-parallel to a longitudinal axis of the anti-shift collar, said longitudinal axis defined through a center of a circle formed by said semi-circular inner perimeter portion.

13. The anti-shift collar as recited in claim 11, further comprising a first clipped end a said second clipped end formed in said elliptical outer perimeter.

14. A method of mounting a stabilizer bar comprising the steps of:
(1) sliding an anti-shift collar over a stabilizer bar, the anti-shift collar having an elliptical outer perimeter, a first clipped end and a second clipped end formed in the elliptical outer perimeter, an inner perimeter including a semi-circular inner perimeter portion, a first polygonal inner perimeter portion and a second polygonal inner perimeter portion, the first polygonal inner perimeter portion and the second polygonal inner perimeter portion contiguous with the semi-circular inner perimeter portion, the first polygonal inner perimeter portion and the second polygonal inner perimeter portion formed respectively adjacent the first clipped end and the second clipped end;

(2) crimping the anti-shift collar simultaneously in four locations upon the elliptical outer perimeter; and (3) forming a first pinched area from the first polygonal inner perimeter portion and the first clipped end and a second pinched area from the second polygonal inner perimeter portion and the second clipped end, the first pinched area and the second pinched area extending outward along a longitudinal axis to retain the anti-shift collar on the stabilizer bar.

15. A method as recited in claim 14, wherein said step (2) further comprises:

(a) directing the crimps generally transverse to the stabilizer bar and not toward a central longitudinal axis of the stabilizer bar.

16. A method as recited in claim 14, wherein said step (2) further comprises:

(a) directing the crimps to take-up a clearance of the first polygonal inner perimeter portion and the second polygonal inner perimeter portion.

17. A method as recited in claim 14, wherein said step (1) further comprises:

(a) sliding the anti-shift collar over the stabilizer bar such that the first polygonal inner perimeter portion and the second polygonal inner perimeter portion pass over a formed ends of the stabilizer bar.

18. The method as recited in claim 14, wherein said semi-circular inner perimeter portion includes a first semi-circular surface and a second, opposed semi-circular surface, each of the first semi-circular surface and the second, opposed semi-circular surface being connected on one end to said first polygonal inner perimeter portion and on an opposite end to said second polygonal inner perimeter portion such that together said first semi-circular surface, said second, opposed semi-circular surface, said first polygonal inner perimeter portion, and said second polygonal inner perimeter portion entirely form said inner perimeter.

19. The method as recited in claim 14, wherein the crimping of the anti-shift collar includes permanently deforming the anti-shift collar.

* * * * *